United States Patent
Singh et al.

(10) Patent No.: US 9,924,227 B2
(45) Date of Patent: Mar. 20, 2018

(54) DETECTING AND PROCESSING MULTIPLEXED CLOSED CAPTION DATA

(71) Applicant: ARRIS Enterprises, Inc., Suwanee, GA (US)

(72) Inventors: Virendra Singh, Bangalore (IN); Dinkar N. Bhat, Princeton, NJ (US); Swaroop Mahadeva, Bangalore (IN); Robert Prestigiacomo, North Wales, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 5 days.

(21) Appl. No.: 14/989,928

(22) Filed: Jan. 7, 2016

(65) Prior Publication Data

US 2016/0198227 A1    Jul. 7, 2016

Related U.S. Application Data

(60) Provisional application No. 62/100,534, filed on Jan. 7, 2015.

(51) Int. Cl.
*H04N 21/435* (2011.01)
*H04N 21/462* (2011.01)
(Continued)

(52) U.S. Cl.
CPC ....... *H04N 21/4622* (2013.01); *H04N 21/435* (2013.01); *H04N 21/4345* (2013.01);
(Continued)

(58) Field of Classification Search
CPC ........... H04N 21/4622; H04N 21/4345; H04N 21/435; H04N 21/4884; H04N 21/6118;
(Continued)

(56) References Cited

U.S. PATENT DOCUMENTS

| | | | |
|---|---|---|---|
| 2006/0158551 A1* | 7/2006 | Kim | H04N 21/235 348/468 |
| 2007/0136777 A1* | 6/2007 | Hasek | H04N 7/17318 725/114 |

(Continued)

OTHER PUBLICATIONS

Unknown, "CEA-708—Wikipedia", Nov. 3, 2014, Retrieved from the internet "https://en.wikipedia.org/w/index.php?title=CEA-708 &oldid=632318087", Retrieved from the internet on Dec. 12, 2016, Supplemental Enhanced Information Table (SEI).*

(Continued)

*Primary Examiner* — Nathan Flynn
*Assistant Examiner* — Caroline Somera
(74) *Attorney, Agent, or Firm* — Bart A. Perkins

(57) ABSTRACT

Methods, systems, and computer readable media can be operable to facilitate the detection of a closed caption standard and corresponding extraction of closed caption data according to the detected closed caption standard. A set-top box (STB) may receive content from multiple different networks and/or service providers, and closed caption data may be formatted differently in content received from the various networks and/or service providers. The STB may identify a relevant standard with which to process closed caption data in a received content stream based upon an identification of the network and/or provider from which the content stream is received, and the STB may extract and render closed caption data using a process associated with the identified network and/or provider.

8 Claims, 6 Drawing Sheets

(51) Int. Cl.
  *H04N 21/488* (2011.01)
  *H04N 21/61* (2011.01)
  *H04N 21/81* (2011.01)
  *H04N 21/434* (2011.01)
  *H04N 21/845* (2011.01)
(52) U.S. Cl.
  CPC ..... *H04N 21/4884* (2013.01); *H04N 21/6118* (2013.01); *H04N 21/6143* (2013.01); *H04N 21/8126* (2013.01); *H04N 21/8451* (2013.01)
(58) Field of Classification Search
  CPC ........... H04N 21/6143; H04N 21/8126; H04N 21/8451
  USPC .......................................................... 725/32
  See application file for complete search history.

(56) References Cited

U.S. PATENT DOCUMENTS

| | | | |
|---|---|---|---|
| 2013/0141536 A1 | 6/2013 | Choe et al. | |
| 2014/0109132 A1* | 4/2014 | Hasek | H04N 7/17318 725/32 |
| 2014/0259052 A1* | 9/2014 | Blanchard | H04H 20/31 725/32 |
| 2015/0312510 A1* | 10/2015 | Park | H04N 5/4401 348/468 |

OTHER PUBLICATIONS

PCT Search Report & Written Opinion, RE: Application No. PCT/US2016/012516, dated Mar. 24, 2016.
Anonymous, CEA-708—Wikipedia, the free encyclopedia, Nov. 3, 2014, retrieved from the Internet at <https://en.wikipedia.org/w/index.php?title=CEA-708&oldid=632318087> on Mar. 11, 2016.
"Manufacturers Codes for H.32X Terminals", Dec. 18, 2013, retrieved from the Internet at <http://www.delta-info.com/DeltaWeb/wp-content/uploads/DDV_PDF/Manucode.pdf> on Mar. 11, 2016.
DVB Organization, "AVCxxx_Draft Annex I for TS 101 154.doc", Digital Video Broadcasting (DVB), Nov. 5, 2004.

* cited by examiner

US 9,924,227 B2

DETECTING AND PROCESSING MULTIPLEXED CLOSED CAPTION DATA

CROSS REFERENCE TO RELATED APPLICATION

This application is a non-provisional application claiming the benefit of U.S. Provisional Application Ser. No. 62/100,534, entitled "Method to Intelligently Detect, Process and Reformat Closed Caption Data Multiplex on an ATSC Receiver," which was filed on Jan. 7, 2015, and is incorporated herein by reference in its entirety.

TECHNICAL FIELD

This disclosure relates to the detection and processing of multiplexed closed caption data.

BACKGROUND

It is common for set-top boxes (STB) to be deployed in heterogeneous environments where the STB can receive broadcast services from different providers, with each service following standards that may be specific to the associated provider. As an example, a STB may receive a video service from a cable operator and a different video service from a satellite provider, as both services may be routed through the same physical network.

Services delivered over different networks may include subtle differences in the encoding and formatting of delivered content. For example, each provider may deliver closed caption data within a content stream using different encoding and formatting parameters. Therefore, when a STB is configured to receive services from multiple providers, the STB may delay or may be unable to deliver some features to an end-user. As an example, a STB may be configured to process closed caption data according to a technique that is tailored to a cable service but that is incompatible with the closed caption format used by a satellite service. As another example, the STB may be configured to render closed caption data of a cable service differently from closed caption data of a satellite service, thereby resulting in an inconsistent display of closed captioning to an end-user. Therefore, it is desirable to improve upon methods and systems for processing closed caption data within content streams received from various sources.

BRIEF DESCRIPTION OF THE DRAWINGS

Like reference numbers and designations in the various drawings indicate like elements.

DETAILED DESCRIPTION

Figure 1:
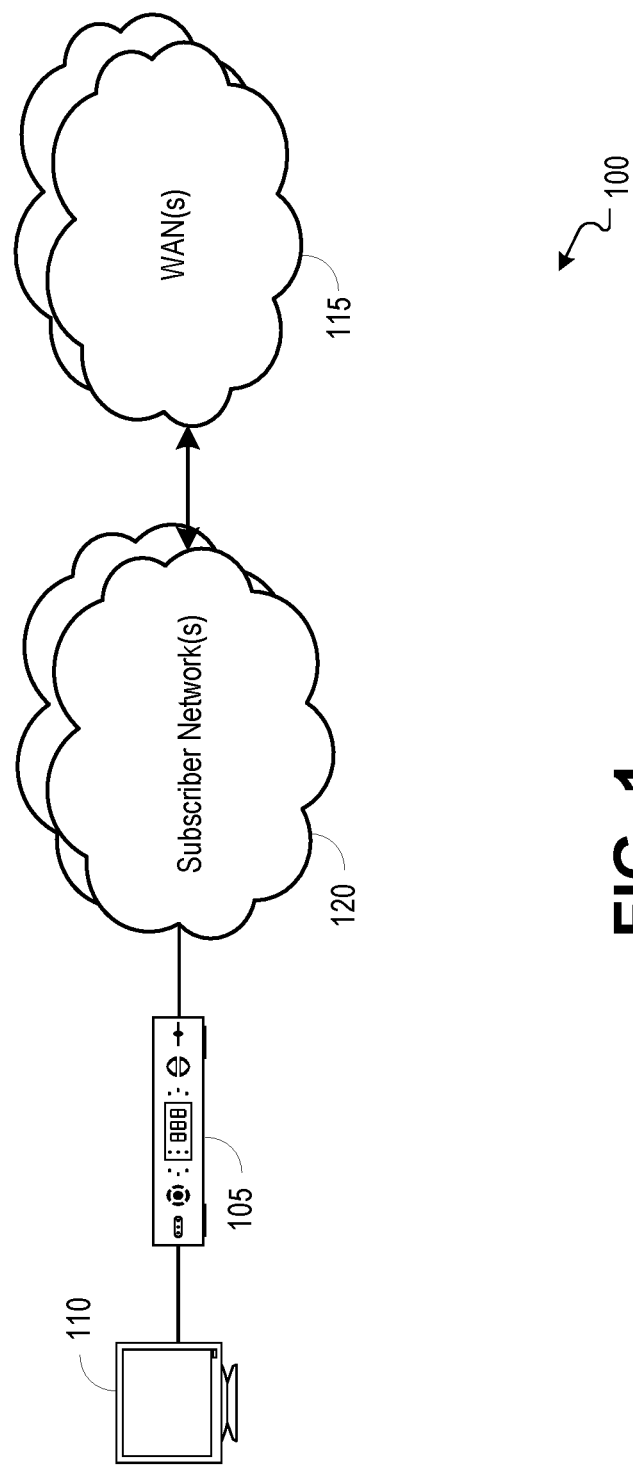
FIG. 1 is a block diagram illustrating an example network environment operable to facilitate the detection of a closed caption standard and corresponding extraction of closed caption data according to the detected closed caption standard.

It is desirable to improve upon methods and systems for processing closed caption data within content streams received from various sources. Methods, systems, and computer readable media can be operable to facilitate the detection of a closed caption standard and corresponding extraction of closed caption data according to the detected closed caption standard. A set-top box (STB) may receive content from multiple different networks and/or service providers, and closed caption data may be formatted differently in content received from the various networks and/or service providers. The STB may identify a relevant standard with which to process closed caption data in a received content stream based upon an identification of the network and/or provider from which the content stream is received, and the STB may extract and render closed caption data using a process associated with the identified network and/or provider.

An embodiment of the invention described herein may include a method comprising: (a) receiving a content stream carrying closed caption data; (b) determining a network from which the content stream is received based upon provider identification data retrieved from supplemental information data carried by the content stream; (c) identifying a closed caption extraction process associated with the determined network; (d) extracting closed caption data from the content stream according to the identified closed caption extraction process; and (e) rendering the closed caption data for output to a display.

According to an embodiment of the invention, the provider identification data comprises a provider code within supplemental information data carried by the content stream.

According to an embodiment of the invention, the determined network comprises a cable network, and the identified closed caption extraction process comprises identifying a closed caption indicator following a processing of one or more user identification bytes within supplemental information data.

According to an embodiment of the invention, the determined network comprises a satellite network, and the identified closed caption extraction process comprises skipping a processing of one or more user identification bytes and identifying a closed caption indicator immediately following a provider code byte within supplemental information data.

According to an embodiment of the invention, the content stream is received at a set-top box configured to receive content from a cable network and a satellite network.

According to an embodiment of the invention, determining the network from which the content stream is received comprises: (a) determining that the content stream is received from the cable network if the provider code matches a provider code associated with the cable network; and (b) determining that the content stream is received from the satellite network if the provider code does not match a provider code associated with the cable network.

According to an embodiment of the invention, determining the network from which the content stream is received comprises determining that the supplemental information data is invalid if the provider code does not match a provider code associated with the cable network or the satellite network.

An embodiment of the invention described herein may include an apparatus comprising: (a) an input interface configured to be used to receive one or more content streams from a plurality of networks; and (b) one or more modules configured to: (i) determine from which one of the plurality of networks a content stream is received based upon provider identification data retrieved from supplemental information data carried by the content stream; (ii) identify a closed caption extraction process associated with the determined network from which the content stream is received; (iii) extract closed caption data from the content stream according to the identified closed caption extraction process; and (iv) render the closed caption data for output to a display.

An embodiment of the invention described herein may include one or more non-transitory computer readable media having instructions operable to cause one or more processors to perform the operations comprising: (a) receiving a content stream carrying closed caption data; (b) determining a network from which the content stream is received based upon provider identification data retrieved from supplemental information data carried by the content stream; (c) identifying a closed caption extraction process associated with the determined network; (d) extracting closed caption data from the content stream according to the identified closed caption extraction process; and (e) rendering the closed caption data for output to a display.

FIG. 1 is a block diagram illustrating an example network environment 100 operable to facilitate the detection of a closed caption standard and corresponding extraction of closed caption data according to the detected closed caption standard. In embodiments, video, voice, and/or data services may be delivered to one or more client devices via one or more customer premise equipment (CPE) devices installed within a subscriber premise. For example, multiple services may be provided by a set-top box (STB) 105 and may be received by a user through a display device (e.g., television 110). It should be understood that a user may receive multiple services through other display devices such as a mobile device, tablet, computer, gaming console, and others. The various data, multimedia, and/or voice services provided by a STB 105 may include, but is not limited to, live or broadcast television, video-on-demand (VoD) content, pay-per view content, recorded content (e.g., DVR content), audio-only content, streaming content, and others.

Multiple services may be delivered to CPE devices over one or more local networks. For example, a local network may be provided by a gateway device, and the multiple services may be delivered to one or more CPE devices by the gateway device. Local network(s) may include a coaxial network, a local area network (LAN), wireless local area network (WLAN), personal area network (PAN), Multimedia over Coax Alliance (MoCA) network, mobile hotspot network, and others. It should be understood that the STB 105 may receive services from and may output upstream communications to an access point (e.g., gateway device, modem, router, wireless extender, etc.) over a wired or wireless connection to the access point.

Multiple services may be delivered to a subscriber premise from a wide-area network (WAN) 115 through a subscriber network 120. The subscriber network 120 may include, for example, a hybrid fiber-coaxial (HFC) network, fiber network, mobile network, satellite network, and any other network operable to deliver services to a subscriber premise.

In embodiments, multimedia content may be received at a STB 105 as a content stream. The content may be delivered to the STB 105 as a stream of packets or frames, and the packets or frames may be decoded and processed for presentation to a user through a connected display device (e.g., television 110). Closed caption data may be received at the STB 105 within the content stream, and the closed caption data may be formatted according to a variety of communication and encoding standards (e.g., CEA-608, CEA-708, etc.). For example, the format (e.g., wrapper format) of closed caption data carried by a content stream may be based upon the delivery method used to transmit the content stream to the STB 105 (e.g., closed caption data carried within a content stream transmitted to a STB 105 as a cable stream, satellite stream, or Internet protocol stream may be formatted differently from each other). Closed caption data may be encapsulated in supplemental information data (e.g., supplementary enhancement information (SEI) units) carried within an MPEG stream (e.g., within a video PID).

In embodiments, a STB 105 may be configured to receive content from a plurality of content or service providers. For example, the STB 105 may receive content from a plurality of different subscriber networks 120 (e.g., cable network, satellite network, etc.) and/or WANs 115. Content streams received from different service providers may be received at the STB 105 in different formats. For example, the wrapper format of closed caption data within content streams transmitted to the STB 105 over a cable network may be formatted according to a first format (e.g., ATSC/SCTE standards), and the wrapper format of closed caption data within content streams transmitted to the STB 105 over a satellite network may be formatted according to a second format (e.g., satellite specific standard).

Content streams of different formats may carry closed caption data differently. For example, closed caption data may be carried by and encoded within a content stream delivered from a cable network differently than closed caption data is carried by and encoded within a content stream delivered from a satellite network. In embodiments, the STB 105 may detect a type of service or network that is used to provide a content stream to the STB 105, and based on the determination of the service or network used, the STB 105 may apply a closed caption extraction and rendering technique that is specific to the service or network used to deliver the content stream.

In embodiments, the STB 105 may determine a closed caption standard associated with a received content stream based on an identification of a network or provider that is based on a parsing of a caption wrapper carrying an element of the content stream. The service for which captions are being rendered at the STB 105 may not include additional metadata in the content stream (e.g., out-of-band data) identifying the service provider associated with the received service. For example, the original service may be re-multiplexed prior to the arrival at the STB 105, and the re-multiplexing of the service may result in a removal of source identification data. Caption data received at the STB 105 may remain in an original format, and the caption wrapper may be parsed for a provider or network identifier (e.g., provider code).

Figure 2:
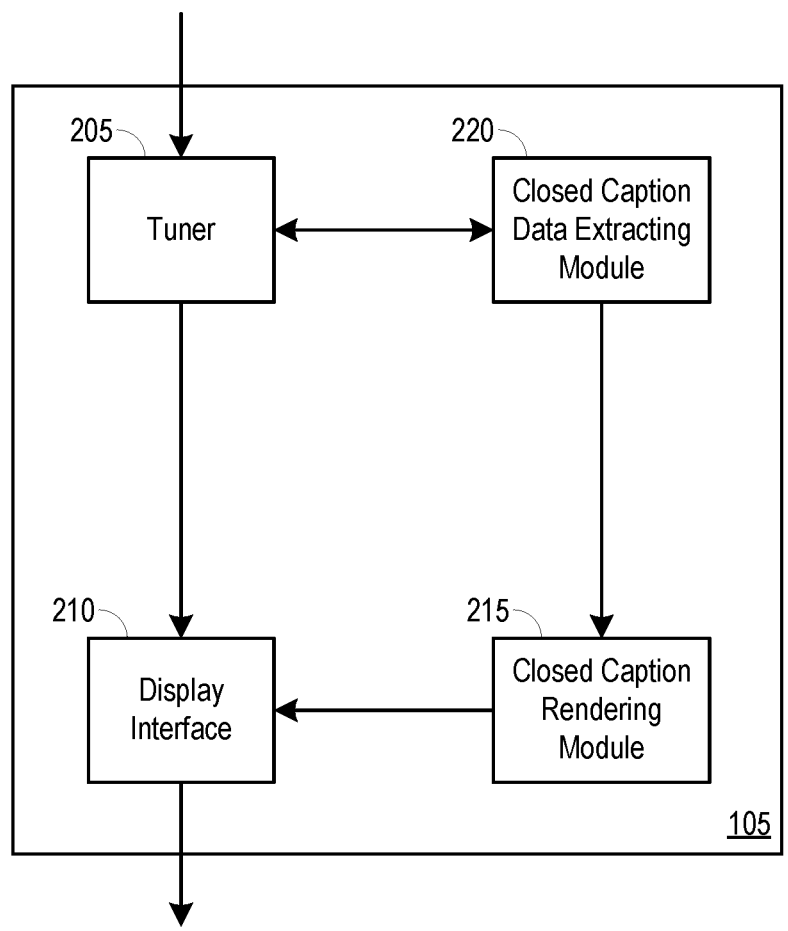
FIG. 2 is a block diagram illustrating an example set-top box (STB) operable to facilitate the detection of a closed caption standard and corresponding extraction of closed caption data according to the detected closed caption standard.

FIG. 2 is a block diagram illustrating an example set-top box (STB) 105 operable to facilitate the detection of a closed caption standard and corresponding extraction of closed caption data according to the detected closed caption standard. The STB 105 may include a tuner 205, a display interface 210, a closed caption rendering module 215, and a closed caption data extracting module 220.

In embodiments, multimedia content may be received at a tuner 205. For example, multimedia content may be received at the tuner 205 from an upstream network (e.g., subscriber network 120 of FIG. 1) as a content stream (e.g., Internet protocol (IP) stream, MPEG stream, etc.). The tuner 205 may decode the received content stream, and process the content for output to a display device (e.g., television 110 of FIG. 1) through the display interface 210. It should be understood that content streams may be received at the tuner 205 in a variety of formats and from a variety of content providers and/or networks. For example, the tuner 205 may receive content streams delivered to the STB 105 over a cable network and/or content streams delivered to the STB 105 over a satellite network.

In embodiments, the closed caption data extracting module 220 may determine a network from which a content stream is delivered to the STB 105. The closed caption data extracting module 220 may differentiate between content streams received over a first network and content streams received over another network based on a service or provider type identifier carried by the received content stream. For example, the closed caption data extracting module 220 may identify supplemental information data (e.g., supplemental enhancement information (SEI)) carried by a received content stream, and the network or service type associated with the received content may be determined based on a provider code that is identified from the supplemental information data (e.g., a provider code of 0x31 may identify a cable network or provider, a provider code of 0x29 may identify a satellite network or provider, etc.). It should be understood that various service and/or provider types may be identified based upon a service/provider type identifier detected within a received content stream. It should be further understood that the closed caption data extracting module 220 may identify a network or provider from communications formatted and/or encoded according to various techniques or standards, and is not limited to any specific video encoding technique or standard.

In embodiments, the closed caption data extracting module 220 may extract closed caption data from a received content stream according to a format associated with the identified service or provider type. The closed caption data extracting module 220 may identify closed caption data within a content stream based upon information carried within supplemental information data (e.g., SEI) of the content stream. For example, if the closed caption data extracting module 220 determines that the received content stream is delivered to the STB 105 over a cable network, the closed caption data extracting module 220 may identify a user data type code (e.g., SEI payload type) that indicates closed caption data after processing one or more bytes that serve as a user identification code. If the closed caption data extracting module 220 determines that the received content stream is delivered to the STB 105 over a satellite network, the closed caption data extracting module 220 may identify a user data type code (e.g., SEI payload type) that indicates closed caption data immediately following the identified provider code (e.g., where the provider code is 0x2F). It should be understood that the closed caption extracting module 220 may be configured with a variety of associations between an identified provider code and a particular service/provider, thus, the closed caption data extracting module 220 may extract closed caption data carried by various types of wrapper formats.

In embodiments, after a determination of the service or provider type, extracted closed caption data may be rendered by the closed caption rendering module 215 and output to a display device (e.g., television 110 of FIG. 1) through the display interface 210. With the closed caption data extracting module 220 identifying a provider or network type associated with a received content stream, and extracting closed caption data from the content stream according to a wrapper format associated with the provider or network type, the closed caption rendering module 215 may render captions using the same approach for all content streams received at the STB 105, regardless of the service, provider, or network associated with the received content streams.

Figure 3:
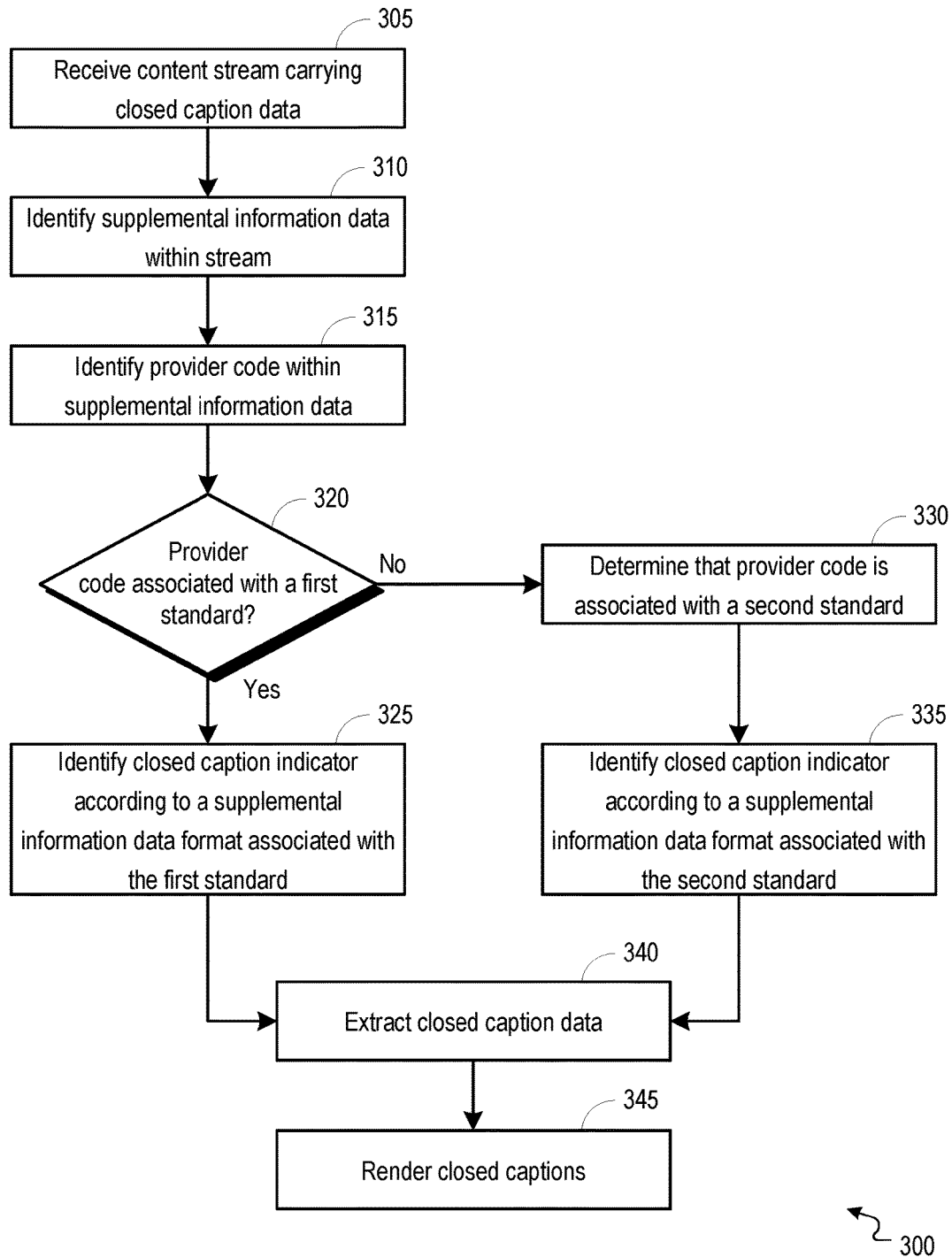
FIG. 3 is a flowchart illustrating an example process operable to facilitate the detection of a closed caption standard and corresponding extraction of closed caption data according to the detected closed caption standard.

FIG. 3 is a flowchart illustrating an example process 300 operable to facilitate the detection of a closed caption standard and corresponding extraction of closed caption data according to the detected closed caption standard. The process 300 can begin at 305, when a content stream carrying closed caption data is received. A content stream carrying closed caption data may be received, for example, by a STB 105 of FIG. 1 (e.g., at a tuner 205 of FIG. 2). In embodiments, the tuner 205 may detect and acquire a lock onto a video packet identifier (PID) (e.g., H.264 video PID) carried by a received content stream. As an example, the process 300 may be initiated each time a STB 105 is tuned to a new channel (e.g., manual channel change initiated by a user, STB-initiated channel change for inserting targeted advertisement, etc.).

At 310, supplemental information data may be identified from within the received content stream. Supplemental information data may be identified, for example, by a closed caption data extracting module 220 of FIG. 2. In embodiments, supplemental information data may carry information associated with the delivery, retrieval, and rendering of the received content stream. For example, an SEI network abstraction layer (NAL) unit may be identified from the received content stream. Identification of the SEI NAL unit may be based on a specific header that is designated for SEI (e.g., SEI may be identified as payload type 6 according to the real-time transport protocol (RTP) payload format of H.264 video).

At 315, a provider code may be identified from within the identified supplemental information data. The provider code may be identified, for example, by the closed caption data extracting module 220 of FIG. 2. In embodiments, the provider code may provide an indication of the service or provider from which the received content stream was delivered to the STB 105. For example, a first unique provider code (e.g., 0x31) may indicate a first standard (e.g., cable standard), and a second unique provider code (e.g., 0x29) may indicate a second standard (e.g., satellite standard).

At 320, a determination may be made whether the identified provider code is associated with a first standard. The determination whether the provider code is associated with a first standard (e.g., a cable standard) may be made, for example, by the closed caption data extracting module 220 of FIG. 2. For example, if the identified provider code matches a unique provider code associated with the first standard (e.g., the provider code is 0x31 which indicates a cable standard), then the determination may be made that the provider code is associated with the first standard.

If, at 320, the determination is made that the provider code is associated with the first standard, the process 300 may proceed to 325. At 325, a closed caption indicator may be identified according to a supplemental information data format associated with the first standard. The closed caption indicator may be identified, for example, by the closed caption data extracting module 220 of FIG. 2. In embodiments, the location of the closed caption indicator within a content stream may depend on the type of service or network associated with the content stream. If the provider code indicates that the content stream is associated with the first standard (e.g., cable standard such as ATSC/SCTE), then the closed caption indicator may look for and identify the closed caption indicator within the content stream at an expected or anticipated location according to the first standard. For example, where the first standard is a cable standard, the closed caption indicator (e.g., user data type code or SEI payload type 0x3) may be located within supplemental information data following the identified provider code and one or more bytes that serve to provide a user identification (e.g., user identifier code). The closed caption data extracting module 220 may process the one or more bytes serving to provide a user identification before identifying and processing the closed caption indicator.

If, at 320, the determination is made that the provider code is not associated with the first standard, the process 300 may proceed to 330. At 330, the determination may be made that the provider code is associated with a second standard. The second standard may be a standard associated with a second provider or service from which the STB 105 is configured to receive content. For example, where the first standard is associated with a cable provider or service, the second standard may be associated with a satellite provider or service.

At 335, a closed caption indicator may be identified according to a supplemental information data format associated with the second standard. The closed caption indicator may be identified, for example, by the closed caption data extracting module 220 of FIG. 2. In embodiments, the location of the closed caption indicator within a content stream may depend on the type of service or network associated with the content stream. If the provider code indicates that the content stream is associated with the second standard (e.g., satellite standard), then the closed caption indicator may look for and identify the closed caption indicator within the content stream at an expected or anticipated location according to the second standard. For example, where the second standard is a satellite standard, the closed caption indicator (e.g., user data type code or SEI payload type 0x3) may be located within supplemental information data immediately following the identified provider code. The closed caption data extracting module 220 may skip over an identification and processing of one or more bytes serving to provide a user identification (e.g., user identifier code) before identifying and processing the closed caption indicator.

At 340, closed caption data may be extracted from the content stream. Closed caption data may be extracted, for example, by the closed caption data extracting module 220 of FIG. 2. In embodiments, the closed caption data extracting module 220 may extract closed caption data from a content stream according to one or more parameters associated with the identified closed caption indicator (e.g., closed caption format associated with network or provider used for delivering the content stream). For example, closed caption data may be uniquely interspersed throughout a content stream based upon the network or provider used for delivering the content stream to the STB 105 (e.g., cable or satellite network/provider). After closed caption data is extracted from the content stream, closed captions may be rendered at 345 (e.g., by the closed caption rendering module 215 of FIG. 2).

Figure 4:
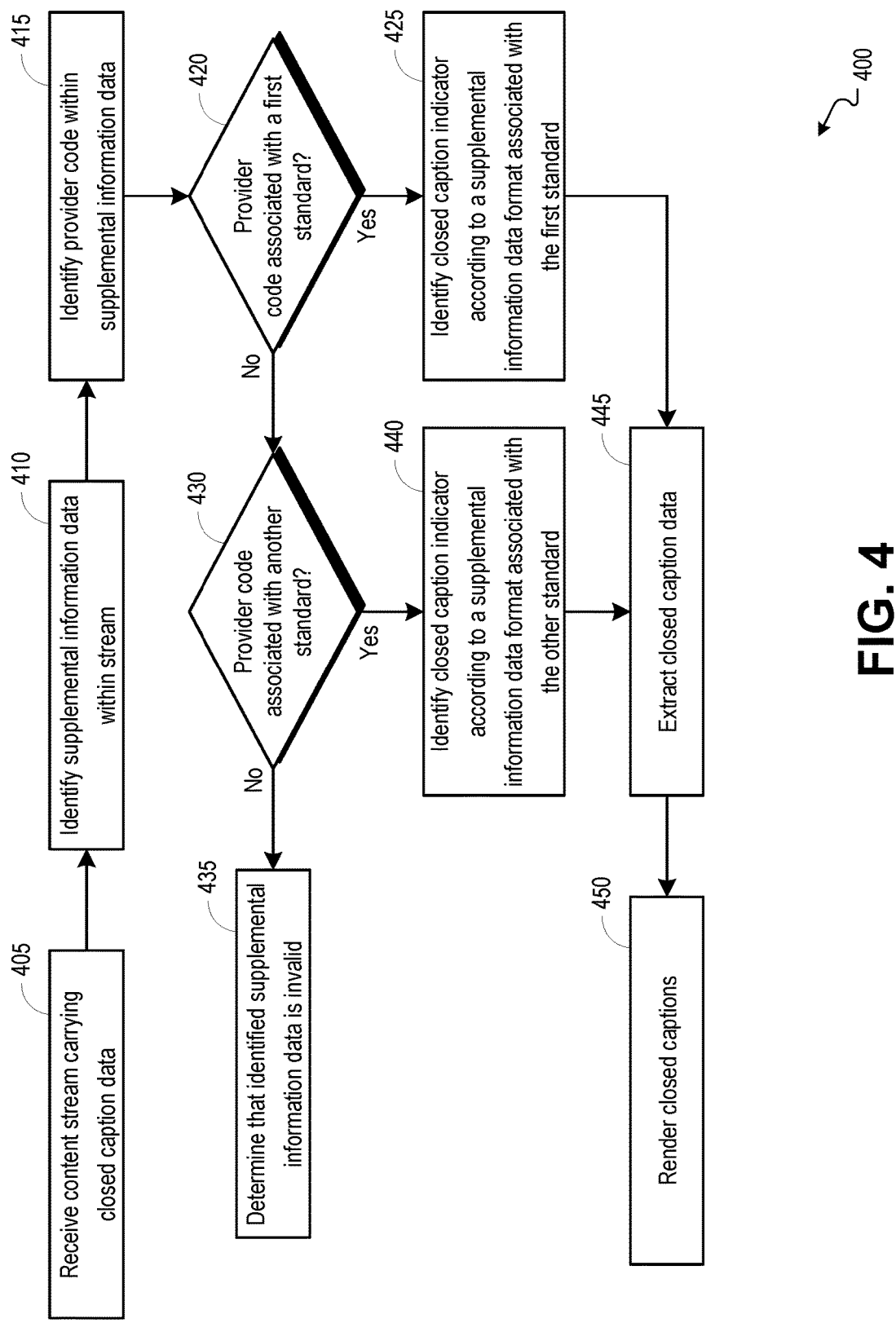
FIG. 4 is a flowchart illustrating an example process operable to facilitate the detection of a closed caption standard based on an identified provider code.

FIG. 4 is a flowchart illustrating an example process 400 operable to facilitate the detection of a closed caption standard based on an identified provider code. The process 400 can begin at 405, when a content stream carrying closed caption data is received. A content stream carrying closed caption data may be received, for example, by a STB 105 of FIG. 1 (e.g., at a tuner 205 of FIG. 2). In embodiments, the tuner 205 may detect and acquire a lock onto a video packet identifier (PID) (e.g., H.264 video PID) carried by a received content stream. As an example, the process 400 may be initiated each time a STB 105 is tuned to a new channel (e.g., manual channel change initiated by a user, STB-initiated channel change for inserting targeted advertisement, etc.).

At 410, supplemental information data may be identified from within the received content stream. Supplemental information data may be identified, for example, by a closed caption data extracting module 220 of FIG. 2. In embodiments, supplemental information data may carry information associated with the delivery, retrieval, and rendering of the received content stream. For example, an SEI network abstraction layer (NAL) unit may be identified from the received content stream. Identification of the SEI NAL unit may be based on a specific header that is designated for SEI (e.g., SEI may be identified as payload type 6 according to the real-time transport protocol (RTP) payload format of H.264 video).

At 415, a provider code may be identified from within the identified supplemental information data. The provider code may be identified, for example, by the closed caption data extracting module 220 of FIG. 2. In embodiments, the provider code may provide an indication of the service or provider from which the received content stream was delivered to the STB 105. For example, a first unique provider code (e.g., 0x31) may indicate a first standard (e.g., cable standard), and a second unique provider code (e.g., 0x29) may indicate a second standard (e.g., satellite standard).

At 420, a determination may be made whether the identified provider code is associated with a first standard. The determination whether the provider code is associated with a first standard (e.g., a cable standard) may be made, for example, by the closed caption data extracting module 220 of FIG. 2. For example, if the identified provider code matches a unique provider code associated with the first standard (e.g., the provider code is 0x31 which indicates a cable standard), then the determination may be made that the provider code is associated with the first standard.

If, at 420, the determination is made that the provider code is associated with the first standard, the process 400 may proceed to 425. At 425, a closed caption indicator may be identified according to a supplemental information data format associated with the first standard. The closed caption indicator may be identified, for example, by the closed caption data extracting module 220 of FIG. 2. In embodiments, the location of the closed caption indicator within a content stream may depend on the type of service or network associated with the content stream. If the provider code indicates that the content stream is associated with the first standard (e.g., cable standard such as ATSC/SCTE), then the closed caption indicator may look for and identify the closed caption indicator within the content stream at an expected or anticipated location according to the first standard. For example, where the first standard is a cable standard, the closed caption indicator (e.g., user data type code or SEI payload type 0x3) may be located within supplemental information data following the identified provider code and one or more bytes that serve to provide a user identification (e.g., user identifier code). The closed caption data extracting module 220 may process the one or more bytes serving to provide a user identification before identifying and processing the closed caption indicator.

If, at 420, the determination is made that the provider code is not associated with the first standard, the process 400 may proceed to 430. At 430, a determination may be made whether the identified provider code is associated with another standard. The determination whether the provider code is associated with another standard (e.g., a satellite standard or other standard associated with a service or provider) may be made, for example, by the closed caption data extracting module 220 of FIG. 2. For example, if the identified provider code matches a unique provider code associated with another standard (e.g., the provider code is 0x29 which indicates a satellite standard), then the determination may be made that the provider code is associated with another standard. It should be understood that the provider code may be compared to provider codes of one or more other standards associated with a service or provider from which the STB 105 is configured to receive content.

If, at 430, the determination is made that the provider code is not associated with another standard, the process 400 may proceed to 435. At 435, the determination may be made that the identified supplemental information data is invalid. The determination that the identified supplemental information data is invalid may be made, for example, by the closed caption data extracting module 220. In embodiments, the closed caption data extracting module 220 may determine that closed caption data cannot be recovered from the received content stream.

If, at 430, the determination is made that the provider code is associated with another standard, the process 400 may proceed to 440. At 440, a closed caption indicator may be identified according to a supplemental information data format associated with the other standard. The closed caption indicator may be identified, for example, by the closed caption data extracting module 220 of FIG. 2. In embodiments, the location of the closed caption indicator within a content stream may depend on the type of service or network associated with the content stream. If the provider code indicates that the content stream is associated with another standard (e.g., satellite standard), then the closed caption indicator may look for and identify the closed caption indicator within the content stream at an expected or anticipated location according to the other standard. For example, where the other standard is a satellite standard, the closed caption indicator (e.g., user data type code or SEI payload type 0x3) may be located within supplemental information data immediately following the identified provider code. The closed caption data extracting module 220 may skip over an identification and processing of one or more bytes serving to provide a user identification (e.g., user identifier code) before identifying and processing the closed caption indicator.

At 445, closed caption data may be extracted from the content stream. Closed caption data may be extracted, for example, by the closed caption data extracting module 220 of FIG. 2. In embodiments, the closed caption data extracting module 220 may extract closed caption data from a content stream according to one or more parameters associated with the identified closed caption indicator (e.g., closed caption format associated with network or provider used for delivering the content stream). For example, closed caption data may be uniquely interspersed throughout a content stream based upon the network or provider used for delivering the content stream to the STB 105 (e.g., cable or satellite network/provider). After closed caption data is extracted from the content stream, closed captions may be rendered at 450 (e.g., by the closed caption rendering module 215 of FIG. 2).

Figure 5:
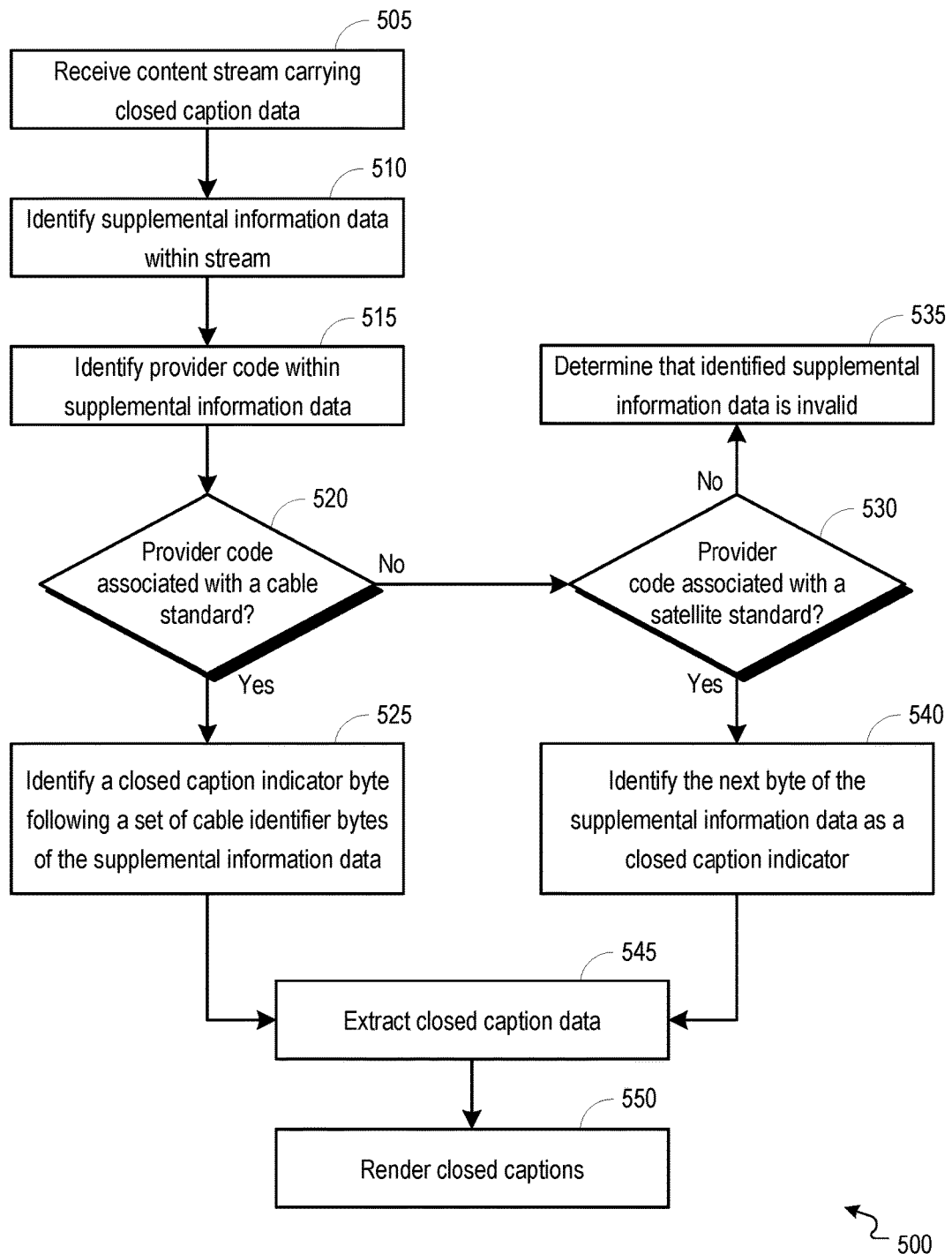
FIG. 5 is a flowchart illustrating an example process operable to facilitate the detection of a closed caption standard and the identification of a closed caption indicator based on an identified provider code.

FIG. 5 is a flowchart illustrating an example process 500 operable to facilitate the detection of a closed caption standard and the identification of a closed caption indicator based on an identified provider code. The process 500 can begin at 505, when a content stream carrying closed caption data is received. A content stream carrying closed caption data may be received, for example, by a STB 105 of FIG. 1 (e.g., at a tuner 205 of FIG. 2). In embodiments, the tuner 205 may detect and acquire a lock onto a video packet identifier (PID) (e.g., H.264 video PID) carried by a received content stream. As an example, the process 500 may be initiated each time a STB 105 is tuned to a new channel (e.g., manual channel change initiated by a user, STB-initiated channel change for inserting targeted advertisement, etc.).

At 510, supplemental information data may be identified from within the received content stream. Supplemental information data may be identified, for example, by a closed caption data extracting module 220 of FIG. 2. In embodiments, supplemental information data may carry information associated with the delivery, retrieval, and rendering of the received content stream. For example, an SEI network abstraction layer (NAL) unit may be identified from the received content stream. Identification of the SEI NAL unit may be based on a specific header that is designated for SEI (e.g., SEI may be identified as payload type 6 according to the real-time transport protocol (RTP) payload format of H.264 video).

At 515, a provider code may be identified from within the identified supplemental information data. The provider code may be identified, for example, by the closed caption data extracting module 220 of FIG. 2. In embodiments, the provider code may provide an indication of the service or provider from which the received content stream was delivered to the STB 105. For example, a first unique provider code (e.g., 0x31) may indicate a first standard (e.g., cable standard), and a second unique provider code (e.g., 0x29) may indicate a second standard (e.g., satellite standard).

At 520, a determination may be made whether the identified provider code is associated with a cable standard. The determination whether the provider code is associated with a cable standard may be made, for example, by the closed caption data extracting module 220 of FIG. 2. For example, if the identified provider code matches a unique provider code associated with a cable standard (e.g., the provider code is 0x31 which indicates a cable standard), then the determination may be made that the provider code is associated with a cable standard.

If, at 520, the determination is made that the provider code is associated with a cable standard, the process 500 may proceed to 525. At 525, a closed caption indicator may be identified according to a supplemental information data format associated with the cable standard. The closed caption indicator may be identified, for example, by the closed caption data extracting module 220 of FIG. 2. The closed caption data extracting module 220 may look for and identify the closed caption indicator within the content stream at an expected or anticipated location according to the cable standard. For example, the closed caption indicator (e.g., user data type code or SEI payload type 0x3) may be located within supplemental information data following the identified provider code and one or more bytes that serve to provide a user identification (e.g., user identifier code). The closed caption data extracting module 220 may process the one or more bytes serving to provide a user identification before identifying and processing the closed caption indicator.

If, at 520, the determination is made that the provider code is not associated with a cable standard, the process 500 may proceed to 530. At 530, a determination may be made whether the identified provider code is associated with a satellite standard. The determination whether the provider code is associated with a satellite standard may be made, for example, by the closed caption data extracting module 220 of FIG. 2. For example, if the identified provider code matches a unique provider code associated with a satellite standard (e.g., the provider code is 0x29 which indicates a satellite standard), then the determination may be made that the provider code is associated with a satellite standard. It should be understood that the provider code may be compared to provider codes of one or more other standards associated with a service or provider from which the STB 105 is configured to receive content.

If, at 530, the determination is made that the provider code is not associated with a satellite standard, the process 500 may proceed to 535. At 535, the determination may be made that the identified supplemental information data is invalid. The determination that the identified supplemental information data is invalid may be made, for example, by the closed caption data extracting module 220. In embodiments, the closed caption data extracting module 220 may determine that closed caption data cannot be recovered from the received content stream.

If, at 530, the determination is made that the provider code is associated with a satellite standard, the process 500 may proceed to 540. At 540, a closed caption indicator may be identified according to a supplemental information data format associated with the satellite standard. The closed caption indicator may be identified, for example, by the closed caption data extracting module 220 of FIG. 2. If the provider code indicates that the content stream is associated with a satellite standard, then the closed caption indicator may look for and identify the closed caption indicator within the content stream at an expected or anticipated location according to the satellite standard. For example, the closed caption indicator (e.g., user data type code or SEI payload type 0x3) may be located within supplemental information data immediately following the identified provider code. The closed caption data extracting module 220 may skip over an identification and processing of one or more bytes serving to provide a user identification (e.g., user identifier code) before identifying and processing the closed caption indicator.

At 545, closed caption data may be extracted from the content stream. Closed caption data may be extracted, for example, by the closed caption data extracting module 220 of FIG. 2. In embodiments, the closed caption data extracting module 220 may extract closed caption data from a content stream according to one or more parameters associated with the identified closed caption indicator (e.g., closed caption format associated with network or provider used for delivering the content stream). For example, closed caption data may be uniquely interspersed throughout a content stream based upon the network or provider used for delivering the content stream to the STB 105 (e.g., cable or satellite network/provider). After closed caption data is extracted from the content stream, closed captions may be rendered at 550 (e.g., by the closed caption rendering module 215 of FIG. 2).

Figure 6:
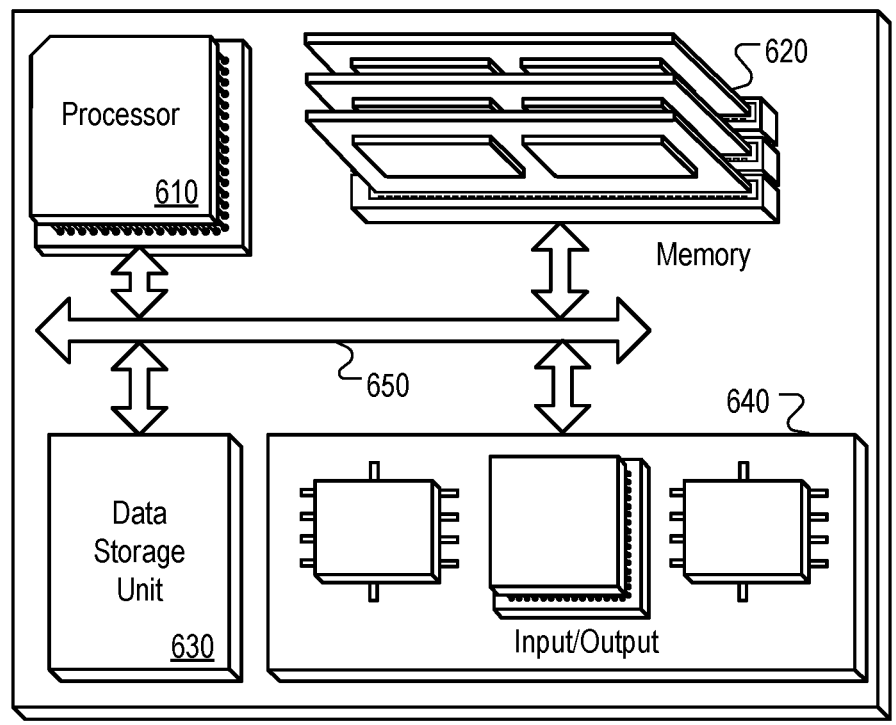
FIG. 6 is a block diagram of a hardware configuration operable to facilitate the detection of a closed caption standard and corresponding extraction of closed caption data according to the detected closed caption standard.

FIG. 6 is a block diagram of a hardware configuration 600 operable to facilitate the detection of a closed caption standard and corresponding extraction of closed caption data according to the detected closed caption standard. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In one implementation, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, and/or data services to a display device (e.g., television 110 of FIG. 1, mobile device, tablet, computer, etc.). In embodiments, the input/output device can include driver devices configured to send communications to, and receive communications from one or more networks (e.g., local network, subscriber network 120 of FIG. 1, WAN 115 of FIG. 1, etc.).

Those skilled in the art will appreciate that the invention improves upon methods and systems for processing closed caption data within content streams received from various sources. Methods, systems, and computer readable media can be operable to facilitate the detection of a closed caption standard and corresponding extraction of closed caption data according to the detected closed caption standard. A set-top box (STB) may receive content from multiple different networks and/or service providers, and closed caption data may be formatted differently in content received from the various networks and/or service providers. The STB may identify a relevant standard with which to process closed caption data in a received content stream based upon an identification of the network and/or provider from which the content stream is received, and the STB may extract and render closed caption data using a process associated with the identified network and/or provider.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
receiving a content stream carrying closed caption data, wherein the content stream is received at a set-top box that receives content from a cable network and a satellite network;
retrieving provider identification data from supplemental information data carried by the content stream;
if the provider identification data matches provider identification data associated with the cable network:
determining that the content stream is received from the cable network;
processing at least one user identification byte that follows the retrieved provider identification data;
identifying a closed caption indicator within the content stream at a position following the at least one user identification byte;
processing the identified closed caption indicator; and
extracting closed caption data from the content stream according to a closed caption extraction process associated with the cable network;
if the provider identification data does not match provider identification data associated with the cable network:
determining that the content stream is received from the satellite network;
foregoing a processing of one or more user identification bytes;
identifying a closed caption indicator within the content stream at a position immediately following the retrieved provider identification data;
processing the closed caption indicator; and
extracting closed caption data from the content stream according to a closed caption extraction process associated with the satellite network;
rendering the closed caption data for output to a display.

2. The method of claim 1, wherein the provider identification data comprises a provider code within supplemental information data carried by the content stream.

3. The method of claim 1, further comprising:
determining that the supplemental information data is invalid if the provider identification data does not match provider identification data associated with the cable network or the satellite network.

4. An apparatus comprising:
an input interface that receives one or more content streams from a cable network and a satellite network; and
one or more modules that:
retrieve provider identification data from supplemental information data carried by the content stream;
if the provider identification data matches provider identification data associated with the cable network:
determine that the content stream is received from the cable network;
process at least one user identification byte that follows the retrieved provider identification data;
identify a closed caption indicator within the content stream at a position following the at least one user identification byte;
process the identified closed caption indicator; and
extract closed caption data from the content stream according to a closed caption extraction process associated with the cable network;
if the provider identification data does not match provider identification data associated with the cable network:
determine that the content stream is received from the satellite network;
forego a processing of one or more user identification bytes;
identify a closed caption indicator within the content stream at a position immediately following the retrieved provider identification data;
process the closed caption indicator; and
extract closed caption data from the content stream according to a closed caption extraction process associated with the satellite network;
render the closed caption data for output to a display.

5. The apparatus of claim 4, wherein the provider identification data comprises a provider code within supplemental information data carried by the content stream.

6. One or more non-transitory computer readable media having instructions operable to cause one or more processors to perform the operations comprising:
receiving a content stream carrying closed caption data, wherein the content stream is received at a set-top box that receives content from a cable network and a satellite network;
retrieving provider identification data from supplemental information data carried by the content stream;
if the provider identification data matches provider identification data associated with the cable network:
determining that the content stream is received from the cable network;
processing at least one user identification byte that follows the retrieved provider identification data;
identifying a closed caption indicator within the content stream at a position following the at least one user identification byte;
processing the identified closed caption indicator; and
extracting closed caption data from the content stream according to a closed caption extraction process associated with the cable network;
if the provider identification data does not match provider identification data associated with the cable network:
determining that the content stream is received from the satellite network;
foregoing a processing of one or more user identification bytes;
identifying a closed caption indicator within the content stream at a position immediately following the retrieved provider identification data;
processing the closed caption indicator; and
extracting closed caption data from the content stream according to a closed caption extraction process associated with the satellite network;
rendering the closed caption data for output to a display.

7. The one or more non-transitory computer-readable media of claim 6, wherein the provider identification data comprises a provider code within supplemental information data carried by the content stream.

8. The one or more non-transitory computer-readable media of claim 6, wherein the instructions are further operable to cause the one or more processors to perform the operations comprising:
determining that the supplemental information data is invalid if the provider identification data does not match provider identification data associated with the cable network or the satellite network.

* * * * *